Figure 1:
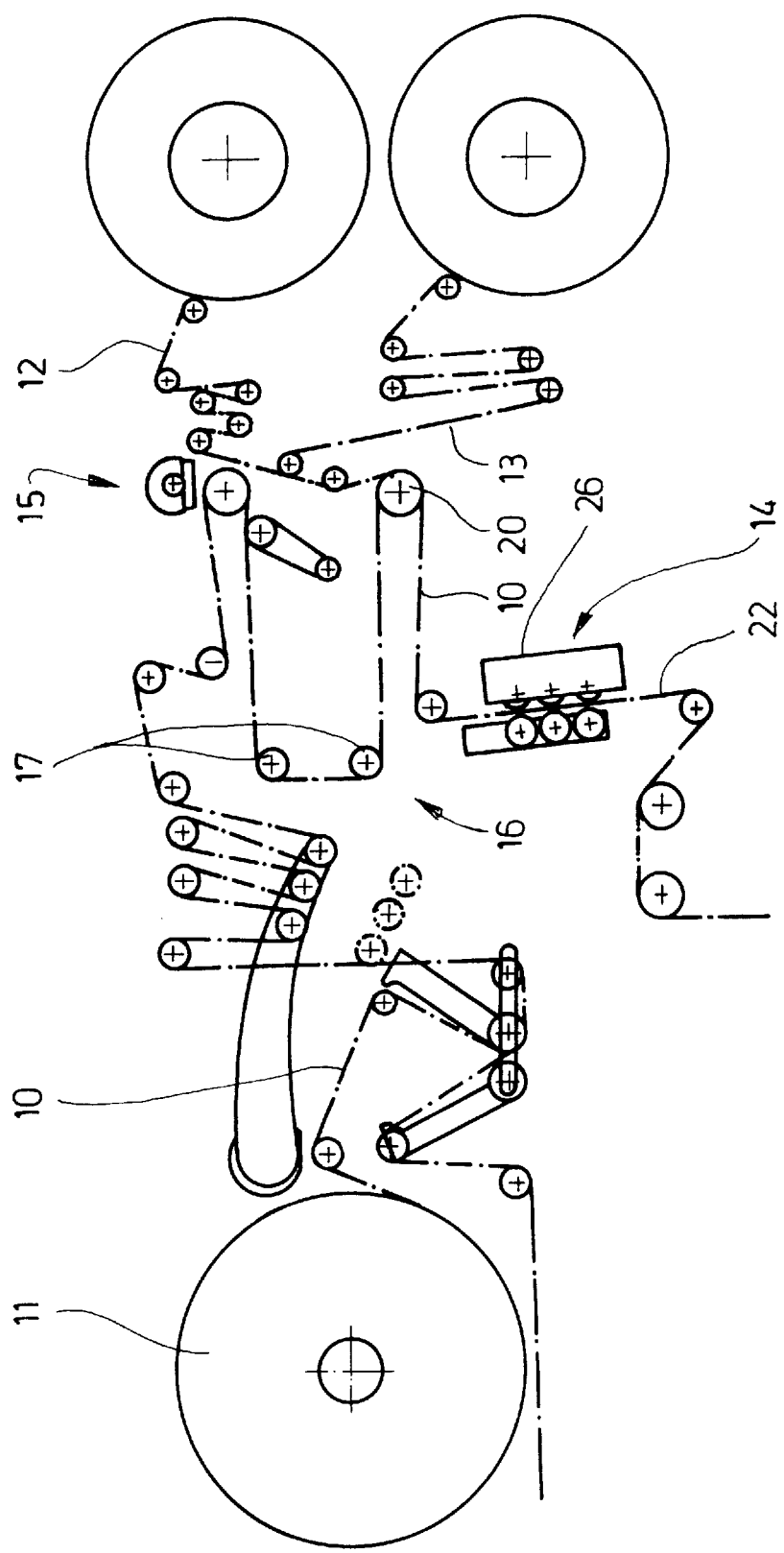

United States Patent [19]
Focke et al.

[11] Patent Number: 5,858,167
[45] Date of Patent: Jan. 12, 1999

[54] APPARATUS FOR CONNECTING A TEAR-OPEN STRIP WITH A FILM WEB

[75] Inventors: Heinz Focke; Johann Köster, both of Verden, Germany

[73] Assignee: Focke & Co., (GmbH & Co), Verden, Germany

[21] Appl. No.: 855,541

[22] Filed: May 13, 1997

[30] Foreign Application Priority Data

May 14, 1996 [DE] Germany .................. 196 19 558.6

[51] Int. Cl.⁶ ............................ B32B 31/08; B32B 31/20
[52] U.S. Cl. ...................... 156/554; 156/555; 156/582; 156/583.4
[58] Field of Search ................... 156/499, 552, 156/554, 555, 580, 582, 583.1, 583.3, 583.4

[56] References Cited

U.S. PATENT DOCUMENTS

| | | | |
|---|---|---|---|
| 2,451,728 | 10/1948 | Gardner et al. | 154/42 |
| 2,660,219 | 11/1953 | Haas et al. | 154/42 |
| 2,845,213 | 7/1958 | Tamarin | 229/51 |
| 3,059,690 | 10/1962 | Nyborg | 156/498 |
| 3,218,961 | 11/1965 | Kraft et al. | 100/93 |
| 3,484,325 | 12/1969 | Pendleton | 156/582 |
| 3,804,697 | 4/1974 | Jacobi | 156/582 |
| 4,067,761 | 1/1978 | Shirley | 156/218 |
| 4,270,965 | 6/1981 | Torterotot et al. | 156/244.11 |
| 4,288,967 | 9/1981 | Seko et al. | 53/550 |
| 4,666,550 | 5/1987 | Spiers et al. | 156/361 |
| 4,717,372 | 1/1988 | Herrington | 493/193 |
| 4,721,501 | 1/1988 | Herrington | 493/193 |
| 4,746,391 | 5/1988 | Heyse et al. | 156/359 |
| 4,808,150 | 2/1989 | Herrington et al. | 493/394 |
| 5,411,625 | 5/1995 | Focke et al. | 156/359 |

FOREIGN PATENT DOCUMENTS

| | | |
|---|---|---|
| 245492 | 2/1966 | Australia . |
| 703063 | 9/1995 | European Pat. Off. . |
| 819497 | 10/1951 | Germany . |
| 1157765 | 11/1963 | Germany . |
| 1511626 | 9/1969 | Germany . |
| 7340444 | 11/1973 | Germany . |
| 2407447 | 8/1975 | Germany . |
| 2237877 | 5/1978 | Germany . |
| 3821266 | 1/1989 | Germany . |
| 9012482 | 12/1990 | Germany . |
| 4215690 | 11/1993 | Germany . |
| 961805 | 6/1964 | United Kingdom . |

OTHER PUBLICATIONS

Walsroder Offnungshilfen, Wolff Walsrode AG, Walsrode, S. 1–9, Nov. 1984.

JP 1-171846 A., In: Patents Abstracts of Japan, M–877, Oct. 6, 1989, vol. 13, No. 446.

*Primary Examiner*—James Sells
*Attorney, Agent, or Firm*—Sughrue, Mion, Zinn, Macpeak & Seas, PLLC

[57] ABSTRACT

Sealing rollers (23, 24, 25) serve for connecting tear-open strips with a film web (10) by applying heat and pressure, the sealing rollers (23, 24, 25) resting against the film web (10) in the region of the tear-open strips. Opposite of the sealing rollers (23, 24, 25) there are positioned counter rollers which make it possible to transfer pressure by means of the sealing rollers (23 to 25). The sealing rollers (23 to 25) are heated, specifically by radiant heat from a heated housing (31), which serves as a carrier for the sealing rollers (23, 24, 25).

6 Claims, 4 Drawing Sheets

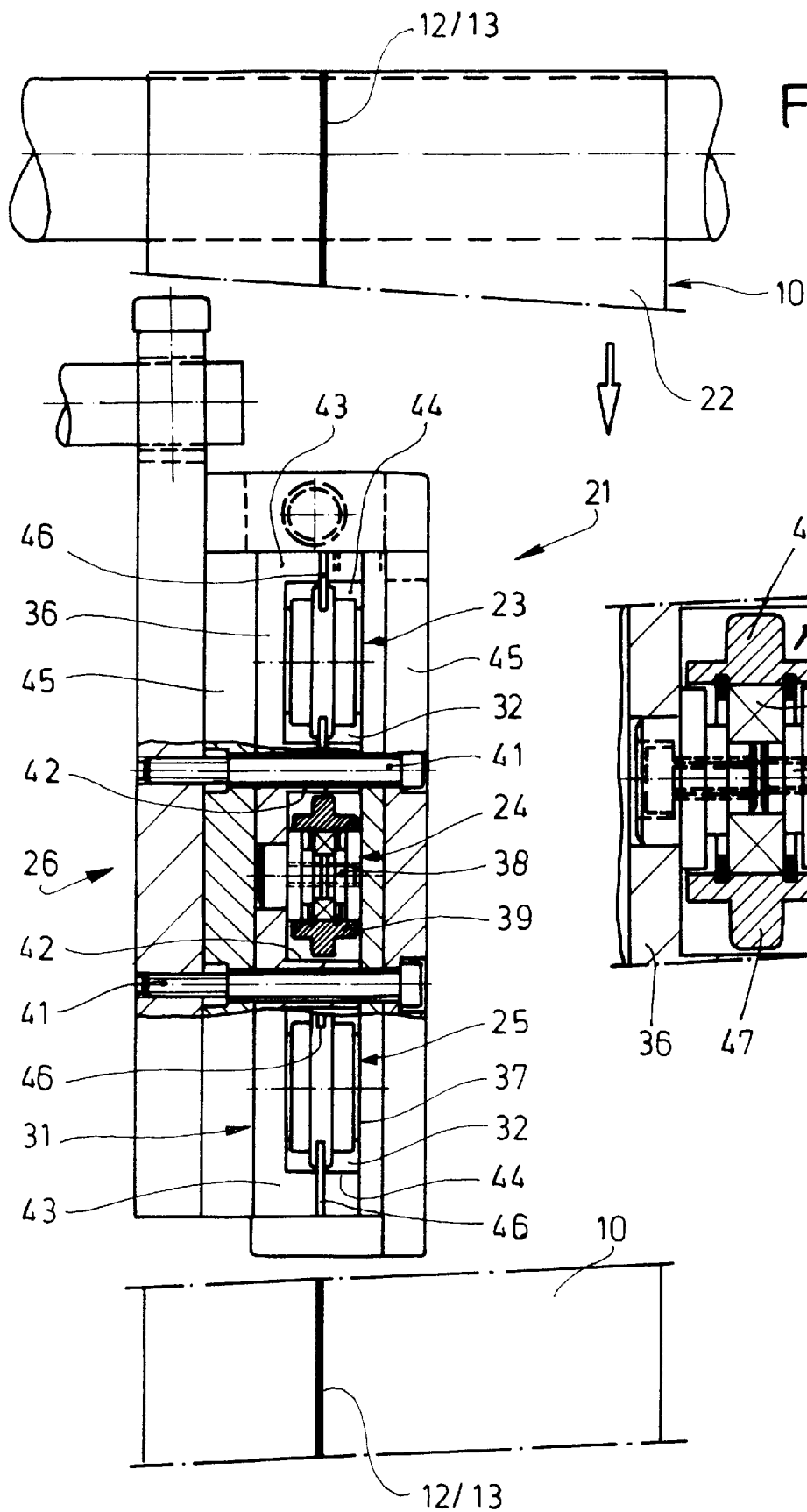
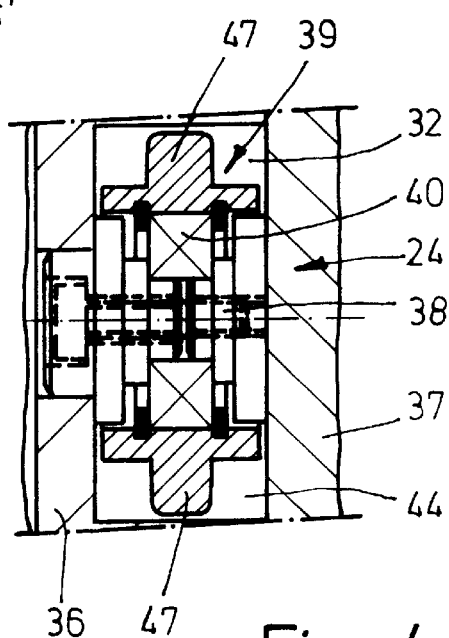
Fig. 3
Fig. 4

APPARATUS FOR CONNECTING A TEAR-OPEN STRIP WITH A FILM WEB

DESCRIPTION

The invention relates to an apparatus for connecting a continuously fed material strip, especially a tear-open strip, with a continuously conveyed web of material, especially a film web, for producing blanks for pack-wrappings with tear-open strips, the material strip and the web of material being connectable to one another by means of heat and pressure.

Packs are often surrounded by an outer wrapping made from thin plastic film or cellophane film. This outer wrapping is removed by means of tear-open strip when the pack is used for the first time. Especially cigarette packs are provided with a wrapping that can be destroyed by a running round tear-open strip.

The tear-open strip is normally continuously attached to the equally continuous film web and connected to the latter by means of adhesive bonding or thermal sealing. In the last-mentioned process, the tear-open strip is provided with an adhesive that can be activated by heat and pressure. Therefore, the connection of the tear-open strip with the film web is time consuming and requires special apparatuses.

The invention is based on the object to improve the attachment of a material strip, especially a tear-open strip, to a film web under heat and pressure, such that the connection is reliable even at higher working speeds.

To attain this object, the apparatus according to the invention is characterized in that the pressure—and sealing members are heated sealing rollers, which are predominantly or exclusively heated indirectly, especially by means of radiant heat.

Consequently, in the apparatus according to the invention, the materials to be connected to one another, namely the film web and the tear-open strip, which is arranged thereon in an accurate position, are conveyed through pressure rollers and counter-pressure rollers, at least the pressure rollers being heated.

In an expedient embodiment of the invention, three indirectly heated pressure rollers and, on the opposite side of the same, three counter-pressure rollers, are positioned successively in the conveying direction and.

A peculiarity of the invention consists in that additional (radiant) heat is transferred to the sealing rollers and, additionally, to the material to be connected, and thus to the tear-open strip and the web of material. For this purpose, thin-walled webs are arranged as heat transfer members that extend between the sealing rollers, follow the contour of the same, and end at a minimal distance from the web of material or the tear-open strip. These webs are (also) heated by the housing. The webs transfer radiant heat to the web of material and to the tear-open strip.

Further details of the invention are subject matter of the patent claims and will be explained in more detail hereinbelow with reference to the drawings. In these FIG. 1 shows a diagrammatic side view of an apparatus for connecting a film web with a tear-open strip, FIG. 2 shows a side view of a connecting station of a tear-open strip and a film web, on an enlarged scale, FIG. 3 shows a partly vertical section of a detail of an apparatus according to FIG. 2 on a further enlarged scale, FIG. 4 shows a single pressure—or sealing roller in a radial section, on a further enlarged scale, FIG. 5. shows a side view of a holder with counter pressure rollers.

The present exemplary embodiment is particularly well suited for the production of cigarette packs with an outer wrapping made of cellophane or plastic film with a tear-open strip. FIG. 1 shows a film unit as a part of a packaging machine.

A film web 10 is continuously drawn off a reel 11 and guided over a multiplicity of deflecting—and control rollers. A tear-open strip 12, 13 is joined with the continuously transported film web 10 and, also during continuous transport, connected with the film web 10 under heat and pressure, in the region of a sealing station 14. The unit comprised of film web and tear-open strip 12, 13 is fed to the packaging machine or to a severing unit for severing blanks for the outer wrapping.

Figure 2:
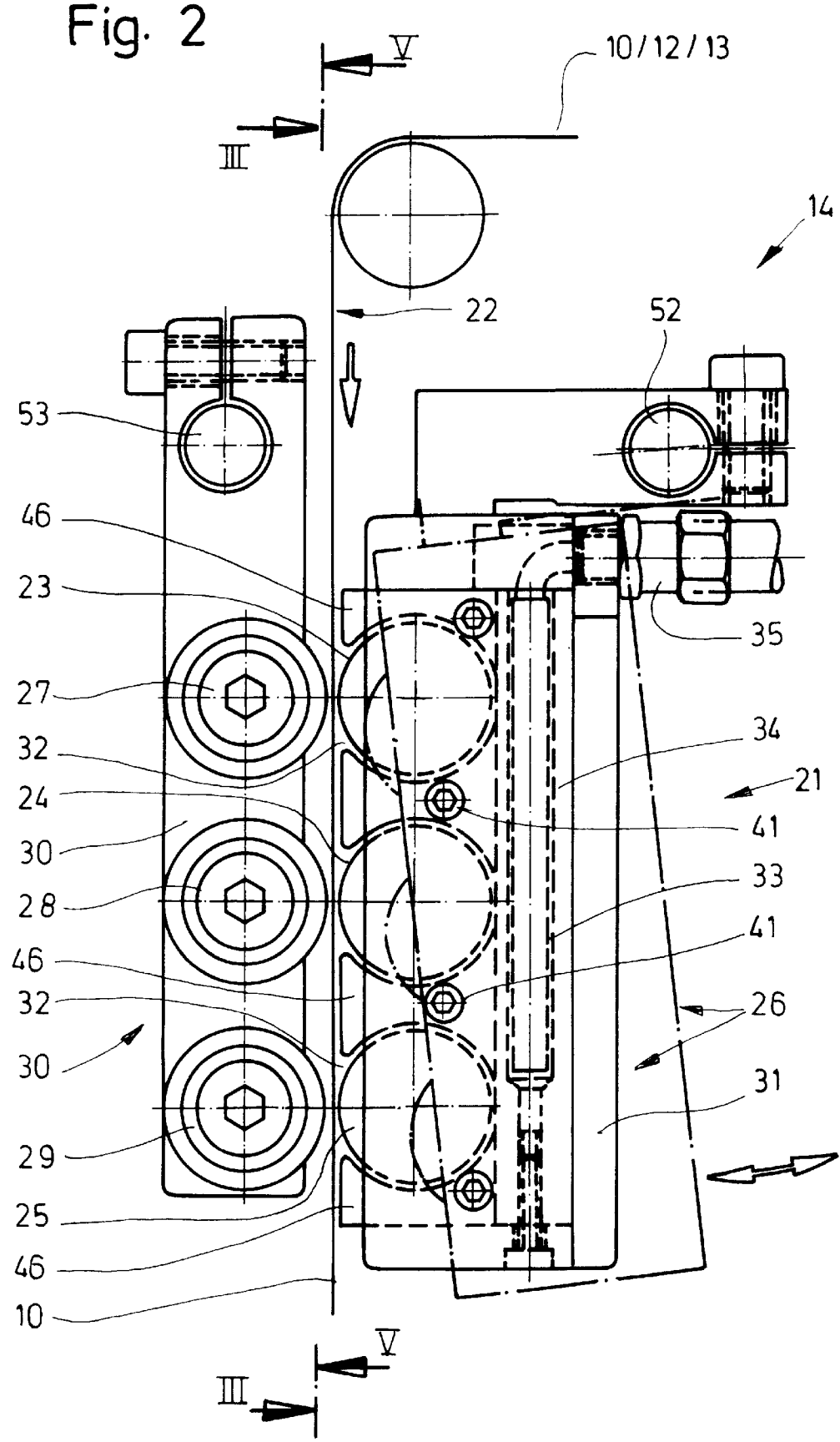

A peculiarity of the apparatus shown in FIG. 1 consists in that this apparatus is designed for a two-track mode of operation. The film web 10 drawn off the reel 11 has double width. In the region of the severing station 15, the web of material 10 is divided into two film webs of half width running next to one another by means of a central longitudinal cut. The two adjacent film webs 10 are deflected in the region of a spreading station 16 by means of spreading rollers 17, in such a way that the two film webs are advanced parallel to one another and at a distance from one another.

Each of the film webs 10 is assigned a tear-open strip 12, 13. These tear-open strips are drawn off separate reels 18, 19. In the region of a joining roller 20, which, at the same time, is a deflecting roller for the two film webs 10, the tear-open strips 12 and 13 are joined with the assigned film webs 10 running next to one another.

Both film webs 10 with tear-open strips 12, 13 adjoining them in an accurate position for the pack are then fed to the sealing station 14 running next to one another. In the sealing station 14, each film web 10 with tear-open strip 12, 13 is assigned to a sealing unit 21. Each of the continuously conveyed film webs 10, which are running at the same speed, is connected to the tear-open strip 12, 13 which rests against the film web 10. Downstream of the sealing station 14, two film webs 10 are thus transported parallel to one another with a tear-open strip sealed against each of them, and advanced for further processing.

The tear-open strips 12, 13 are designed in such a way that, or provided with a coating in such a way that a durable connection with the film web 10 is ensured when heat and pressure is applied. The sealing member 21 is designed such that heat and pressure are continuously applied to the film webs 10 or the tear-open strips 12, 13 during the continuous transport of the former.

In the present exemplary embodiment, the sealing unit 21 takes effect in the region of an upright strand 22 of the film web 10 and tear-open strip 12, 13. In the conveying direction of the film web, a plurality of sealing rollers 23, 24, 25 following one another in the longitudinal direction of the film web take effect on the film web 10 and the tear-open strip 12, 13. In the present case, three sealing rollers 23, 24, 25 are positioned on top of one another on a common upright carrier 26. The sealing rollers 23, 24, 25 rest against the tear-open strips 12, 13 and, therefore, indirectly against the film webs 10 in the region of the tear-open strips in order to apply pressure.

On the side of the film web opposite of the sealing rollers 23 to 25, counter pressure members are positioned, namely (three) counter rollers 27, 28, 29. The counter rollers 27 to 29 are each mounted exactly opposite of the sealing rollers 23 to 25. The film web 10 and the tear-open strip 12, 13 are pressed against the periphery of the counter rollers 27 to 29 during the conveying movement by means of the sealing rollers 23 to 25. Sealing rollers 23 to 25 and counter rollers 27 to 29 are driven with respect to the conveying speed of the film web, and thus rotated by the film web 10 as a result of the conveying movement.

The sealing rollers 23 to 25 are heated such that, in addition to the pressure, heat is also transferred by the sealing rollers 23 to 25. In the present exemplary embodiment, an indirect heating of the sealing rollers 23 to 25 is provided, specifically by means of radiant heat.

The carrier 26 takes the form of a housing 31 which almost entirely surrounds the sealing rollers 23 to 25, namely except of small regions or openings 32 for the passage of sealing surfaces of the sealing rollers 23 to 25 in the region of the film web 10. The housing 31 is directly heated, in the present case by means of a heating cartridge 33 extending in the longitudinal direction. This heating cartridge 33 is positioned in a bore 34, which extends on the side opposite of the film web 10 in the housing immediately next to the circumferential surfaces of the sealing rollers 23 to 25. The housing 31 heated in this manner transfers the heat to the sealing rollers 23 to 25. At the upper end, the heating cartridge 33 is provided with a connection 35 for electric lines.

The housing 31 for the sealing rollers 23 to 25 is designed in a special manner, such that the (radiant) heat is directly transferred from the housing 31 to the film web 10 or the tear-open strips 12, 13. In the present case, the housing 31 consists of two parallel longitudinal walls 36, 37 in which the sealing rollers 23 to 25 are mounted with axes of rotation 38 which take the form of bolts. As shown, in particular in FIGS. 3 and 4, a live ring 39 of the sealing rollers 23 to 25 is mounted on the axis of rotation 38 with a rolling bearing 40.

The two longitudinal walls 36, 37 are connected to one another by means of transversely directed connecting bolts 41. These extend in the region of transverse walls 42 of the housing 31. At the ends, and thus at the top and at the bottom, the housing 31 is closed by end walls 43. The sealing rollers 23 to 25 are thus each mounted in chambers 44, which are merely open (openings 32) at the side, and thus in the direction towards the film web 10.

The housing 31 configured in this manner is surrounded on the outside by insulating plates 45, which reduce heat losses to the outside. The insulating plates 45 extend in the region of the longitudinal walls 36, 37 and end walls 43. The connecting bolts 41 extend through the insulating plates, such that the unit of housing 31 and insulating plates 45 is held together by the connecting bolts 41. At the same time, these connecting bolts 41 serve for connecting the described unit with the carrier 26, which takes the form of a one-armed lever. Consequently, the housing 31 is laterally attached to this carrier 26.

Between the sealing rollers 23 to 25 there are arranged additional members for the transfer of (radiant) heat to the tear-open strips 12, 13 on the side of the housing 31 facing the film web 10. These members are webs 46, which are arranged on the housing 31 as comparatively thin-walled members precisely in the region of the tear-open strips 12, 13, namely on the transverse walls 42 and end walls 43. The webs 46 are configured such that they follow the contour of the sealing rollers 23 to 25 at a distance and extend at a small distance of, for example, ⅕ to ½ mm from the tear-open strip 12, 13. As a result, additional heat is transferred without contact.

The sealing rollers 23 to 25 are designed in a special manner. A running round sealing web 47 is formed in the region of the outer sealing surface. This sealing web 47 approximately corresponds to the width of the tear open strips 12, 13 or is slightly wider. Due to this sealing web 47, the live ring 39 as the outer region of the sealing rollers 23 to 24 has a T-shaped cross-section. This part of the sealing rollers 23 to 25 consists of a metallic material with a high thermal conductivity.

In the present case, the counter rollers 27 to 29 only have the task of producing the required counter pressure for sealing. The counter rollers 27 to 29 are also mounted on running bearings 48 with shaft journals 49. These are laterally connected with the holder 30, which takes the form of a one-armed lever.

Figure 5:
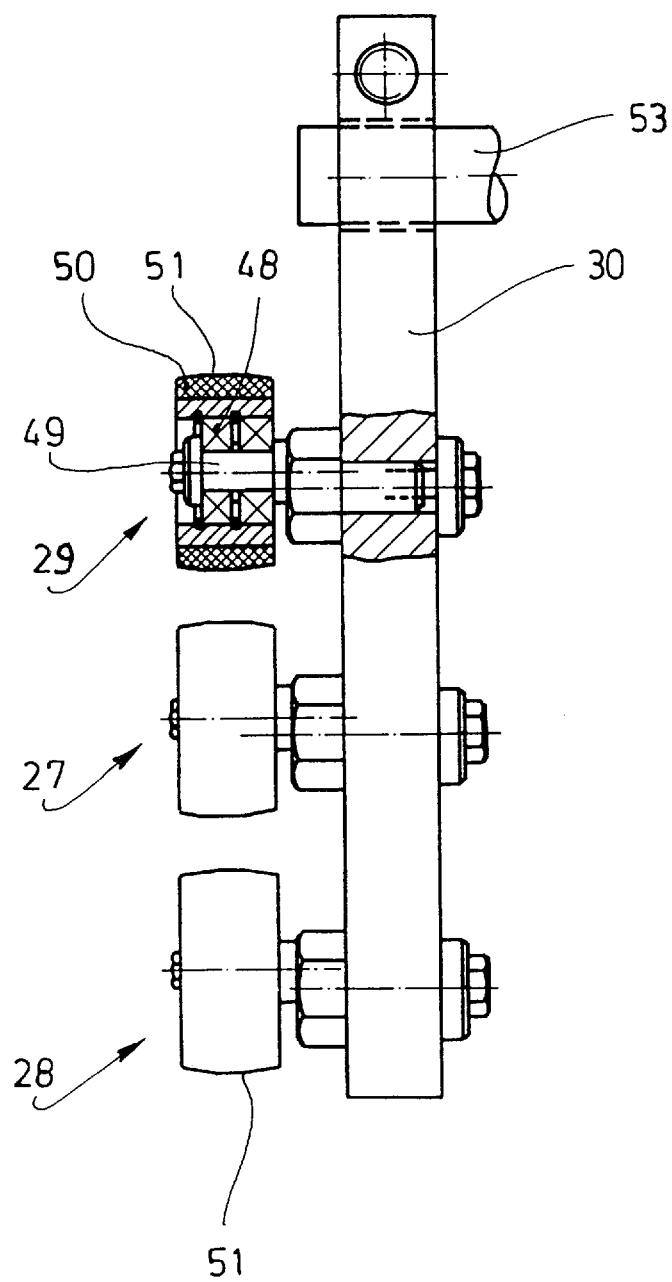

The counter rollers 27 to 29 have a wider outer bearing area or surface area than the sealing rollers 23 to 25. In the shown exemplary embodiment, the outer circumference of the counter roller 27 to 29 is configured to be resilient. FIG. 5 shows that for this purpose a sleeve 50 made from resilient material, especially from silicone, is attached to the counter rollers 27 to 29. Consequently, the film web 10 is pressed against the resilient sleeve 50 by means of the sealing rollers 23, 24. As shown, this sleeve 50 has a crowned outer bearing surface 51 in this area.

The sealing rollers 23 to 25 and/or counter rollers 27 to 29 are mounted so as to be adjustable. In the present case, the carrier 26, on the one hand, and the holder 30, on the other, are arranged so as to be movable. The angular carrier 26 is rotatably mounted on a stationary supporting journal 52. In the case of interruption, the sealing unit 21 or the carrier 26 with the sealing rollers is moved out of contact with the film web 10, namely by pivoting into the position shown in dot-dash lines in FIG. 2.

The holder 30 for the counter rollers 27 to 28 is rotatably mounted on a supporting journal 53 on one side. Due to this mounting, the relative position of the holder 30 with the counter rollers 27 to 29 can be adjusted.

I claim:

1. An apparatus for connecting a continuously fed elongated tear-open strip (12, 13) with a continuously fed film web (10) for the production of blanks for pack wrappings with tear-open strips, the film web (10) and the tear-open strip (12, 13) being connected to each other by heated sealing (23, 24, 25) and counter (27, 28, 29) rollers which are rotated in accordance with a conveying movement of the film web (10) and the tear-open strip (12, 13), wherein:

the sealing rollers (23, 24, 25) are rotatably mounted, with an axial spacing from one another, in a housing (31) made of a material with high thermal conductivity;

the housing (31) is heated by at least one heating cartridge (33) disposed in the housing (31);

disposed between adjacent ones of said sealing rollers (23, 24, 25) and in a region of outer ones of said sealing rollers (23, 25) are heat transfer members in the form of wide webs (46) of thermally conducting material which extend in the longitudinal direction of the tear-open strip (12, 13) and are heated by the housing (31);

the webs (46) end at a distance from the tear-off strip (12, 13); and the webs (46) conform to the contour of the sealing rollers (23, 24, 25).

2. The apparatus according to claim 1, wherein the housing (31) is approximately U-shaped in profile, and wherein each of the sealing rollers (23, 24, 25) is mounted in the housing contactlessly (31) on a rotation axis (38) with a rolling bearing (40).

3. The apparatus according to claim 2, wherein the sealing rollers (23, 24, 25) have an outer rim bearing (39) with a T-shaped profile, wherein a narrower, outer sealing web (47) that runs all around abuts against the tear-open strip (12, 13), and wherein the outer rim bearing (39) is interiorly mounted rotatably on the rotation axis (38) with the rolling bearing (40).

4. The apparatus according to claim 1, wherein the housing (31) for the sealing rollers (23, 24, 25) is configured as a one-armed pivotable lever and is mounted pivotably such that the housing (31) is lifted by the sealing rollers (23, 24, 25) from the film web (10) or from the tear-open strip (12, 13) into a position of the housing (31) that is oblique relative to the film web (10).

5. The apparatus according to claim 1, wherein the counter rollers (27, 28, 29) are arranged on a common holder (30) to form a one-armed lever that is pivotable relative to the sealing rollers (23, 24, 25).

6. The apparatus as claimed in claim 1, wherein the distance is ⅕ to ½ mm.

* * * * *